(12) United States Patent
Tsuchiya

(10) Patent No.: US 10,758,851 B2
(45) Date of Patent: Sep. 1, 2020

(54) FUEL FILTER DEVICE

(71) Applicant: YAMAHA HATSUDOKI KABUSHIKI KAISHA, Shizuoka-ken (JP)

(72) Inventor: Toshiya Tsuchiya, Shizuoka-ken (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 772 days.

(21) Appl. No.: 13/869,123

(22) Filed: Apr. 24, 2013

(65) Prior Publication Data

US 2014/0175004 A1     Jun. 26, 2014

(30) Foreign Application Priority Data

Dec. 26, 2012   (JP) ................................. 2012-282071

(51) Int. Cl.
     *B01D 35/00*      (2006.01)
     *B01D 35/30*      (2006.01)
     (Continued)

(52) U.S. Cl.
     CPC ........ *B01D 35/30* (2013.01); *B01D 2201/302* (2013.01); *F02M 37/00* (2013.01);
     (Continued)

(58) Field of Classification Search
     CPC .. B01D 2201/302; B01D 35/30; B01D 29/00; F02M 37/22
     See application file for complete search history.

(56) References Cited

U.S. PATENT DOCUMENTS 3,698,747 A   *   10/1972   Wing .................... F16L 37/144
                                                         285/305
3,841,489 A   *   10/1974   Combest ................ B01D 35/02
                                                         210/223

(Continued)

FOREIGN PATENT DOCUMENTS

JP      2005-180271 A      7/2005
JP      2010-196696 A      9/2010

OTHER PUBLICATIONS

Dorman, Dorman connector-fuel line 800-134, Mar. 1, 2012, pp. 1-4.*

(Continued)

*Primary Examiner* — Bobby Ramdhanie
*Assistant Examiner* — Michael J An
(74) *Attorney, Agent, or Firm* — Rabin & Berdo, P.C.

(57) ABSTRACT

A fuel filter device is disclosed. The fuel filter device has a first member that includes a main body tubular portion and a first connection tubular portion for connecting the first member to a fuel pipe. The main body tubular portion includes a flow channel cross-section greater than that of the first connection tubular portion. The main body tubular portion includes a first end portion and a second end portion. The first connection tubular portion is disposed on the first end portion. An opening is provided through the second end portion. A filter element portion is accommodated in the main body tubular portion. A second member includes a lid portion and a second connection tubular portion for connecting the second member to a fuel pipe. The lid portion covers the opening of the main body tubular portion.

15 Claims, 16 Drawing Sheets

(51) Int. Cl.
*F16L 37/12* (2006.01)
*F02M 37/00* (2006.01)
*F16L 37/14* (2006.01)
*F02M 37/22* (2019.01)

(52) U.S. Cl.
CPC .............. *F02M 37/22* (2013.01); *F16L 37/12* (2013.01); *F16L 37/144* (2013.01)

(56) References Cited

U.S. PATENT DOCUMENTS

| | | | | |
|---|---|---|---|---|
| 4,036,758 A | * | 7/1977 | Combest | 210/223 |
| 4,256,474 A | * | 3/1981 | Berger, Jr. | B01D 29/114 |
| | | | | 220/301 |
| 4,493,717 A | * | 1/1985 | Berger, Jr. | B01D 46/0005 |
| | | | | 210/304 |
| 4,526,411 A | * | 7/1985 | Bartholomew | F16L 37/12 |
| | | | | 285/305 |
| 5,016,922 A | * | 5/1991 | Le Mer | F24H 9/122 |
| | | | | 285/305 |
| 5,089,132 A | * | 2/1992 | Sussich | B01D 35/02 |
| | | | | 210/298 |
| 5,433,241 A | * | 7/1995 | Robinson | 137/115.13 |
| 5,586,792 A | * | 12/1996 | Kalahasthy et al. | 285/319 |
| 6,213,143 B1 | * | 4/2001 | Schwegler et al. | 137/115.27 |
| 2001/0002007 A1 | * | 5/2001 | Zupan | B01D 29/21 |
| | | | | 210/448 |
| 2006/0219622 A1 | * | 10/2006 | Arteche | B01D 29/07 |
| | | | | 210/323.1 |
| 2007/0095744 A1 | * | 5/2007 | Bagci | B01D 29/21 |
| | | | | 210/435 |

OTHER PUBLICATIONS

Date for Dorman, Dorman connector-fuel line 800-134, Mar. 1, 2012, p. 1.*

* cited by examiner

FUEL FILTER DEVICE

CROSS-REFERENCE TO RELATED APPLICATIONS

This application claims priority to Japanese Patent Application No. 2012-282071 filed on Dec. 26, 2012, the entirety of which is hereby incorporated by reference in its entirety.

BACKGROUND OF THE INVENTION

Field of the Invention

The present invention relates to a fuel filter device.

Description of the Related Art

A fuel filter device is attached to a fuel pipe and filters a fuel passing therethrough. For example, Japan Laid-open Patent Application Publication No. JP-A-2005-180271 describes a fuel strainer device that accommodates a filter inside a strainer body. An opening end of the strainer body is closed with a strainer cover. The strainer cover is fixed to the strainer body, while being swaged to a flanged portion provided on the strainer body.

On the other hand, Japan Laid-open Patent Application Publication No. JP-A-2010-196696 describes a pre-filter of a fuel supply device in which filter medium is contained in a case provided by a lid member and a main body. The lid member and the main body are designed to be attachable to and detachable from each other by means of a screw-in type coupling structure.

SUMMARY OF THE INVENTION

In the fuel strainer device described in the Publication No. JP-A-2005-180271, the strainer cover is swaged to the strainer body, and thereby, filter replacement cannot be done by taking out only the filter. Therefore, the fuel filter device is detached from the fuel pipe. At this time, the fuel pipe may be scratched. Further, filter replacement costs may be significant because the fuel filter device is entirely replaced.

In the pre-filter of the fuel supply device described in the Publication No. JP-A-2010-196696, the lid member and the main body are attachable to and detachable from each other by means of the screw-in type coupling structure. Therefore, only filter medium can be replaced by detaching the lid member from the main body.

However, in the structure that each of the lid member and the main body is provided with a threaded portion, the lid member and the main body are rotated relatively to each other in attaching to or detaching from each other. In this case, a fuel pipe connected to the main body and another fuel pipe connected to the lid member are rotated relatively to each other. Therefore, the fuel pipe disposed upstream of the pre-filter and that disposed downstream of the pre-filter are inevitably twisted. The fuel pipes may be damaged or broken when twisted. Otherwise, chances are that fitting portions between the fuel pipes and the pre-filter are damaged or broken. Incidentally, the fuel pipes cannot be twisted when made of material such as metal or resin. Therefore, a replacement work of the pre-filter cannot be easily performed.

It is an object of the present invention to provide a fuel filter device for substantially preventing a fuel pipe from being scratched in filter replacement, reducing a cost of filter replacement, and making a filter replacement work easy.

A fuel filter device according to an aspect of the present invention includes a first member, a filter element portion, a second member and an attachment portion. The first member includes: a first connection tubular portion for connecting the first member to a fuel pipe; and a main body tubular portion. The main body tubular portion has a flow channel cross-section greater than that of the first connection tubular portion. The main body tubular portion includes a first end portion and a second end portion. The first connection tubular portion is disposed on the first end portion. An opening is provided through the second end portion. The filter element portion is accommodated in the main body tubular portion. The second member includes: a second connection tubular portion for connecting the second member to a fuel pipe; and a lid portion. The lid portion covers the opening of the main body tubular portion. The second member is configured to be detachable from the main body tubular portion when caused to perform a slide action in a center axial direction of the main body tubular portion. The attachment portion is configured to be able to restrict and derestrict (allow) the slide action of the second member.

In the fuel filter device according to the aspect of the present invention, the second member is detachable from the main tubular portion by releasing restriction applied to the slide action of the second member by the attachment portion. Therefore, the filter element portion can be replaced without detaching the first member and the second member respectively from the relevant fuel pipes. Accordingly, the fuel pipes can be substantially prevented from being scratched in filter replacement. Further, only the filter element portion can be replaced without replacing the first member and the second member. Therefore, it is possible to reduce the cost associated with filter replacement.

Further, the second member is detached from the main body tubular portion by means of the slide action thereof. Therefore, the second member is detachable from the main body tubular portion without excessively rotating either the second member or the first member relatively to the relevant fuel pipe. Accordingly, filter replacement work may be simplified.

BRIEF DESCRIPTION OF THE DRAWINGS

Referring now to the attached drawings which form a portion of this original disclosure.

DETAILED DESCRIPTION OF THE PREFERRED EMBODIMENTS

Figure 1:
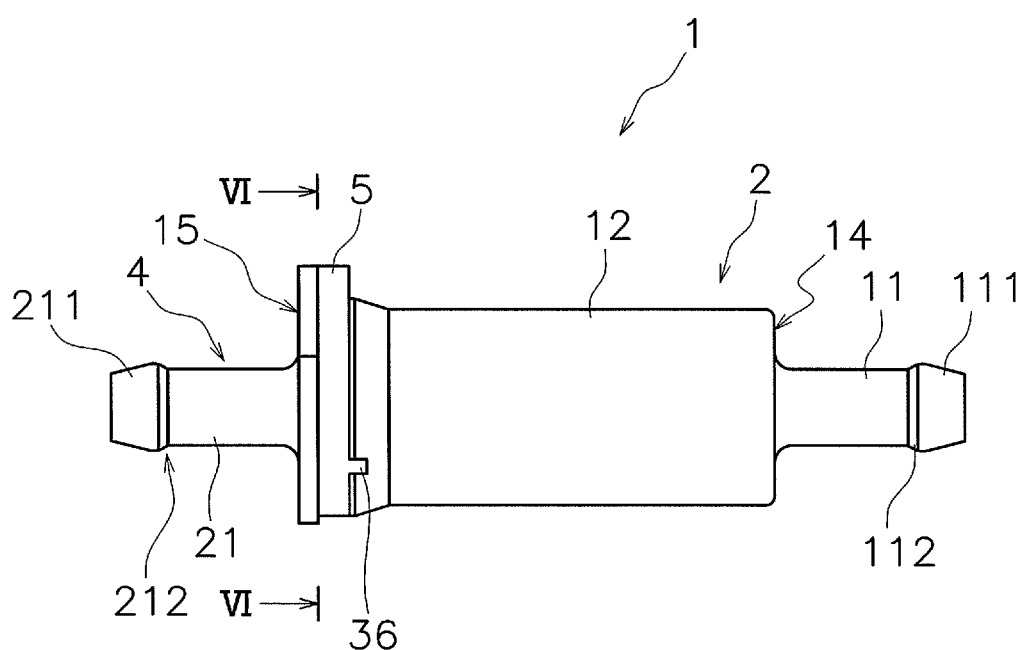
FIG. 1 is a side view of a fuel filter device according to a first exemplary embodiment.
Figure 2:
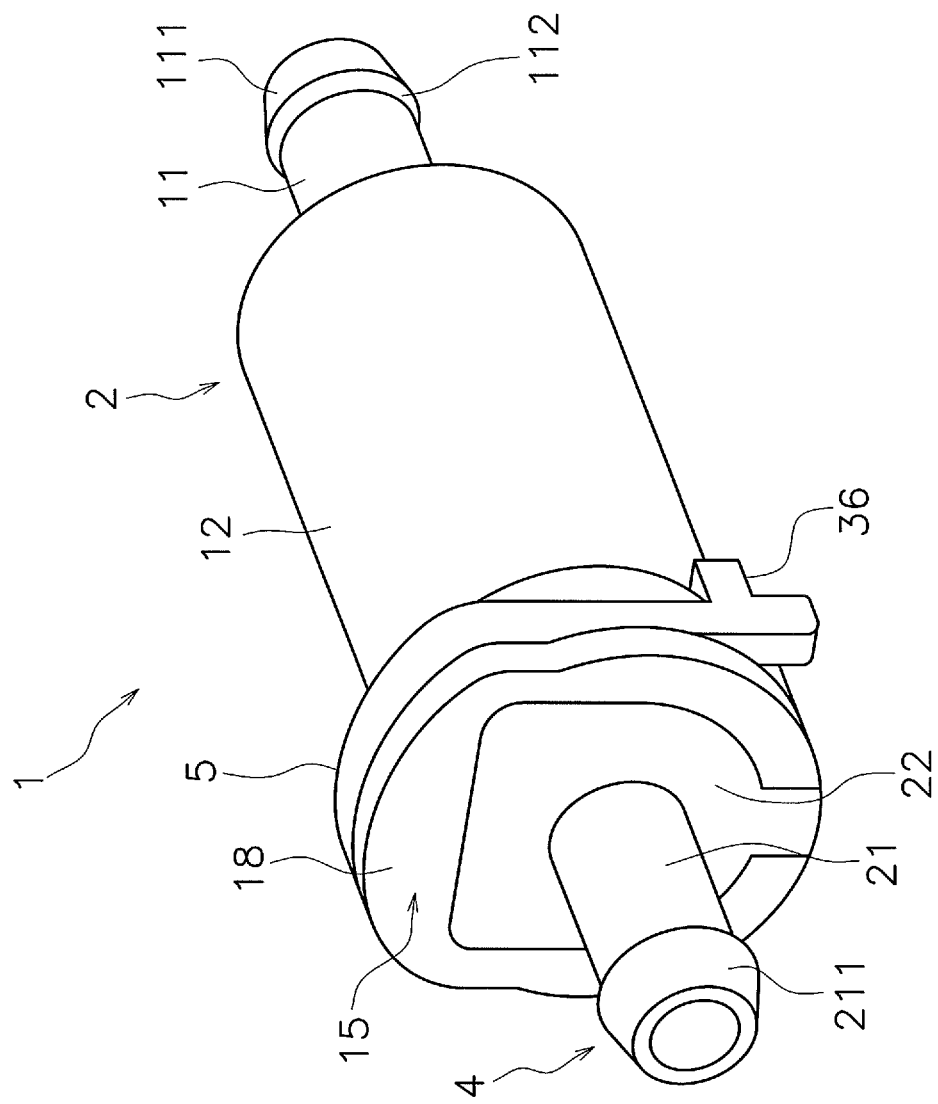
FIG. 2 is a perspective view of the fuel filter device.
Figure 3:
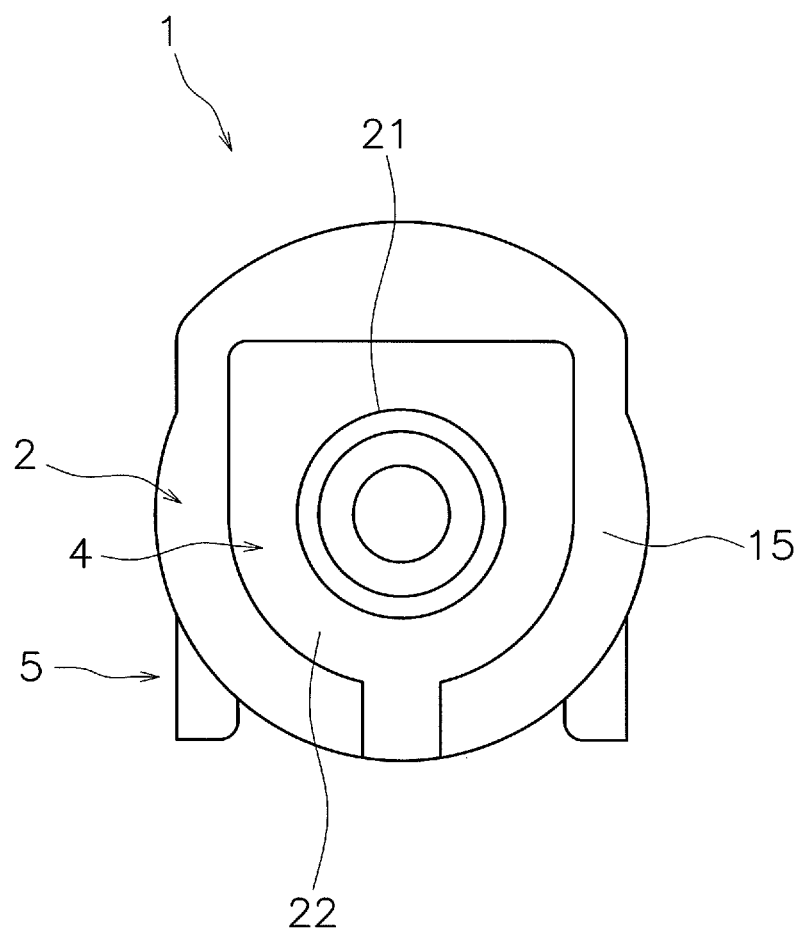
FIG. 3 is a front view of the fuel filter device.
Figure 4:
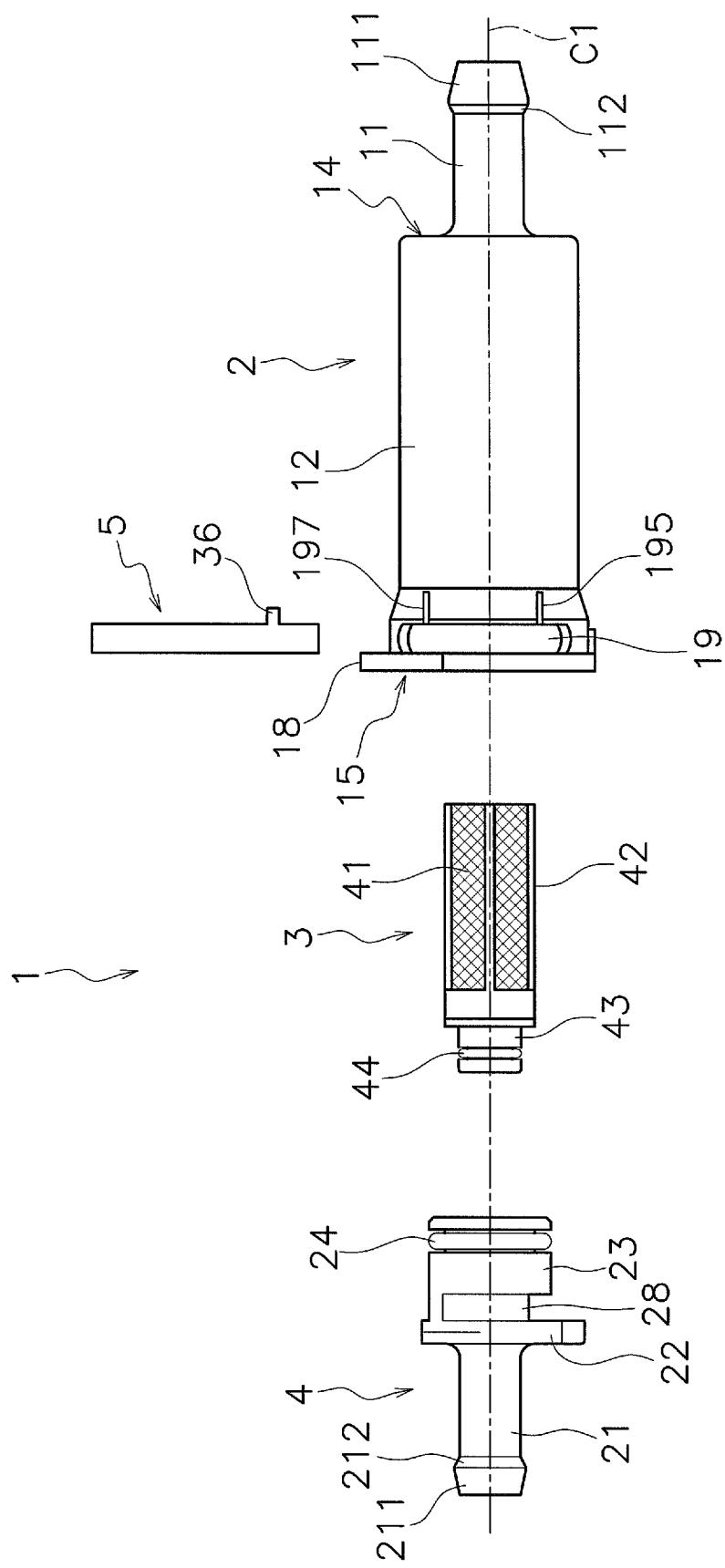
FIG. 4 is an exploded side view of the fuel filter device.
Figure 5:
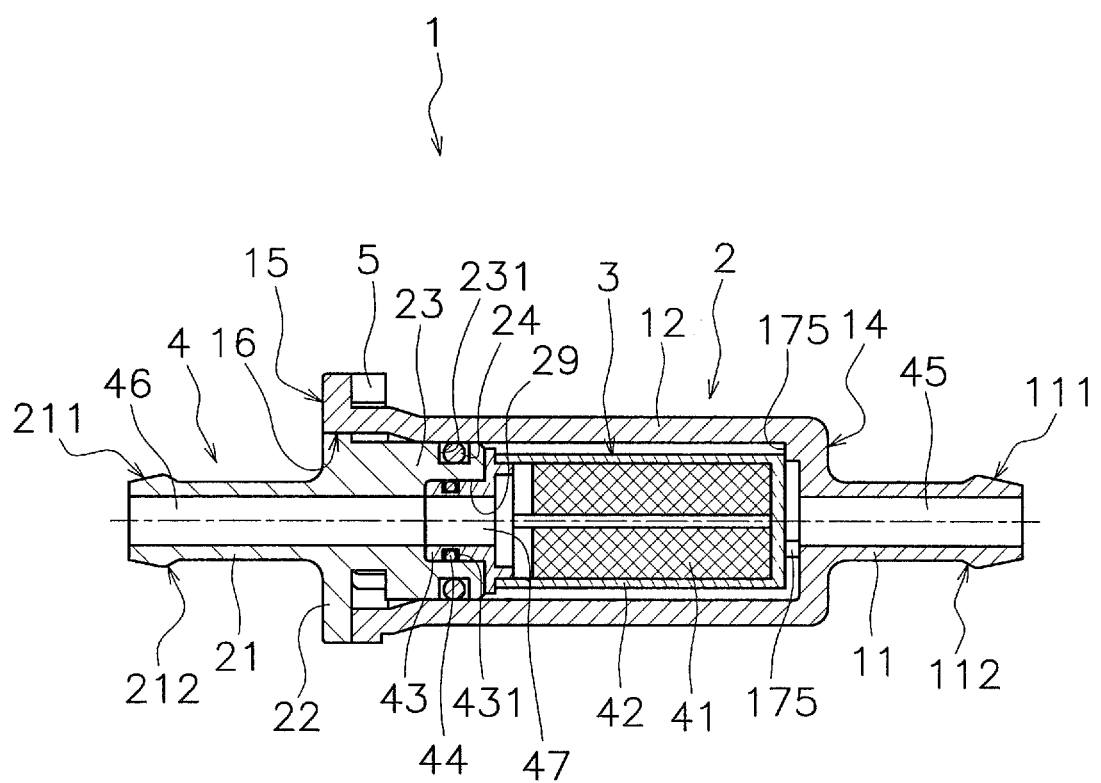
FIG. 5 is a cross-sectional side view of the fuel filter device.

With reference to the attached drawings, an explanation will be hereinafter made for a fuel filter device according to an exemplary embodiment of the present invention. FIG. 1 is a side view of a fuel filter device 1. FIG. 2 is a perspective view of the fuel filter device 1. FIG. 3 is a front view of the fuel filter device 1 seen from the left side in FIG. 1. FIG. 4 is an exploded side view of the fuel filter device 1. FIG. 5 is a cross-sectional side view of the fuel filter device 1. As illustrated in FIGS. 1 to 5, the fuel filter device 1 includes a first member 2, a filter element portion 3, a second member 4 and an attachment portion 5.

It should be noted that, in the following explanation, the term "forward" is defined as a direction from the first member 2 to the second member 4 along a center axial direction of the fuel filter device 1 (see C1 in FIG. 4). By contrast, the term "rearward" is defined as a direction from the second member 4 to the first member 2 in the center axial direction of the fuel filter device 1 (see C1 in FIG. 4). Further, in the following explanation, the terms "up", "down", "right" and "left" respectively refer to the corresponding directions thereof in FIG. 3.

The first member 2 is a member separately provided from the filter element portion 3, the second member 4 and the attachment portion 5. The first member 2 accommodates the filter element portion 3. The second member 4 is detachably attached to the first member 2. The second member 4 functions as a lid for closing the accommodation space of the first member 2 in which the filter element portion 3 is accommodated. The attachment portion 5 functions as a stopper for holding the second member 4 so that the second member 4 is substantially prevented from being detached from the first member 2.

A fuel pipe is connected to the first member 2. Another fuel pipe is connected to the second member 4. For example, a fuel pipe, disposed upstream in a fuel supply system, is connected to the second member 4. On the other hand, a fuel pipe, disposed downstream in the fuel supply system, is connected to the first member 2. It should be noted that, contrary to the above, the downstream-side fuel pipe may be connected to the second member 4, while the upstream-side fuel pipe may be connected to the first member 2.

The first member 2 is made of resin. The first member 2 includes a first connection tubular portion 11 and a main body tubular portion 12. The first connection tubular portion 11 is a portion for connecting the first member 2 to the relevant fuel pipe. The first connection tubular portion 11 includes a tapered portion 111 and a bath portion 112. The first connection tubular portion 11 is connected to the relevant fuel pipe by press-fitting the tapered portion 111 and the barb portion 112 into the relevant fuel pipe.

The main body tubular portion 12 has a flow channel cross-section greater than that of the first connection tubular portion 11. When explained in detail, the main body tubular portion 12 has an inner diameter greater than that of the first connection tubular portion 11. Further, the main body tubular portion 12 has an outer diameter greater than that of the first connection tubular portion 11. The center axis of the first connection tubular portion 11 and that of the main body tubular portion 12 are arranged substantially in the same direction. When explained in detail, the center axis of the first connection tubular portion 11 and that of the main body tubular portion 12 are concentrically arranged.

As illustrated in FIG. 4, the main body tubular portion 12 includes a first end portion 14 and a second end portion 15. The first end portion 14 is the rear end portion of the main body tubular portion 12. The second end portion 15 is the front end portion of the main body tubular portion 12. The first connection tubular portion 11 is disposed on the first end portion 14. As illustrated in FIG. 5, the second end portion 15 includes an opening 16. The opening 16 is communicated with the accommodation space produced within the main body tubular portion 12. Therefore, when the filter element portion 3 is replaced, the filter element portion 3 is taken out of the accommodation space through the opening 16. The filter element portion 3 is also inserted and disposed in the accommodation space through the opening 16.

Figure 6:
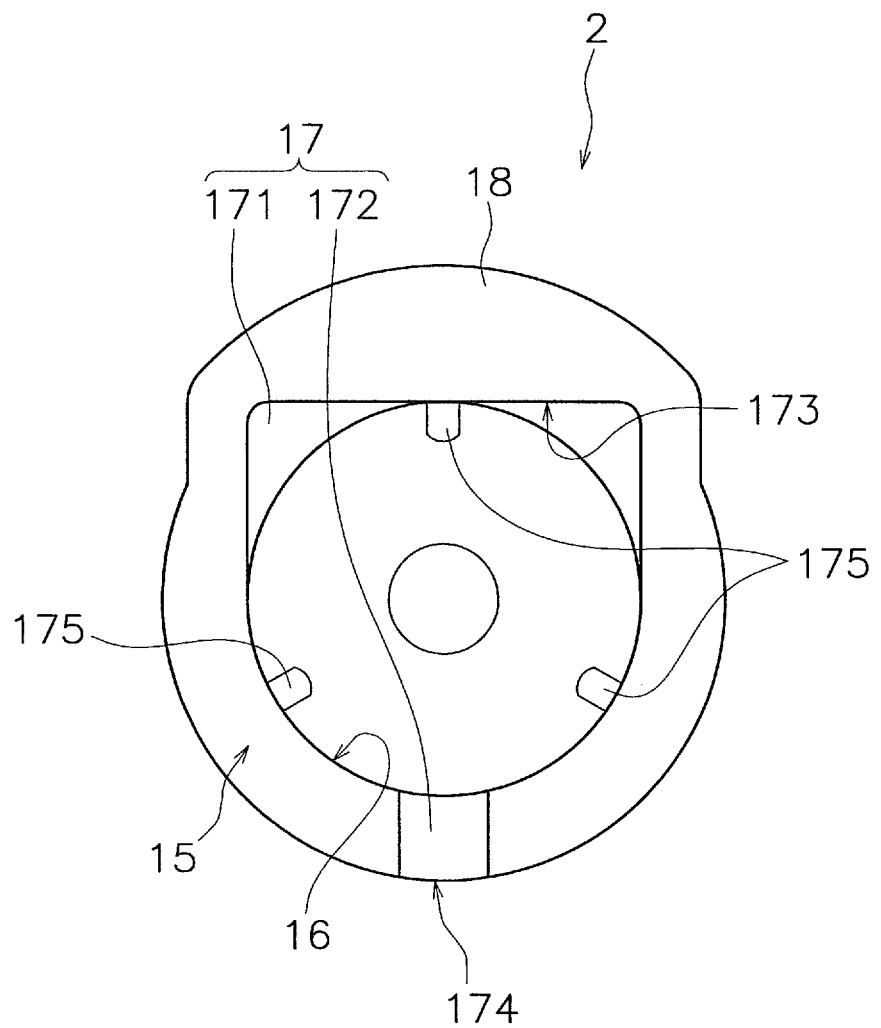
FIG. 6 is a front view of a first member.

FIG. 6 is a front view of the first member 2. The second end portion 15 of the main body tubular portion 12 includes a first engaging portion 17. The first engaging portion 17 is a section for positioning between the main body tubular portion 12 and a lid portion 22 of the second member 4 to be described (see FIGS. 4 and 8). The first engaging portion 17 includes a first recess 171 and a second recess 172.

The first recess 171 has a shape backwardly recessed from the end surface of the second end portion 15. The first recess 171 is positioned radially outwards of the inner peripheral surface of the main body tubular portion 12. In a front view, an edge 173 of the first recess 171 has a non-circular shape. When explained in detail, the edge 173 of the first recess 171 has a linear shape provided along an engaging edge 271 of the lid portion 22 to be described (see FIG. 8).

The second recess 172 has a shape backwardly recessed from the end surface of the second end portion 15. The second recess 172 is positioned radially outwards of the inner peripheral surface of the main body tubular portion 12. An edge 174 of the second recess 172 reaches the outer peripheral surface of the second end portion 15. In a front view, the second recess 172 has a shape matched with a protrusion 272 of the lid portion 22 to be described (see FIG. 8).

The second end portion 15 is provided with a flange 18. As illustrated in FIG. 4, the flange 18 is disposed while being upwardly protruded from the main body tubular portion 12.

As illustrated in FIG. 4, the main body tubular portion 12 includes a guide slit 19. The attachment portion 5 is engaged with the guide slit 19. The guide slit 19 is disposed adjacently to the flange 18. The guide slit 19 is disposed rearwards of the flange 18.

Figure 7:
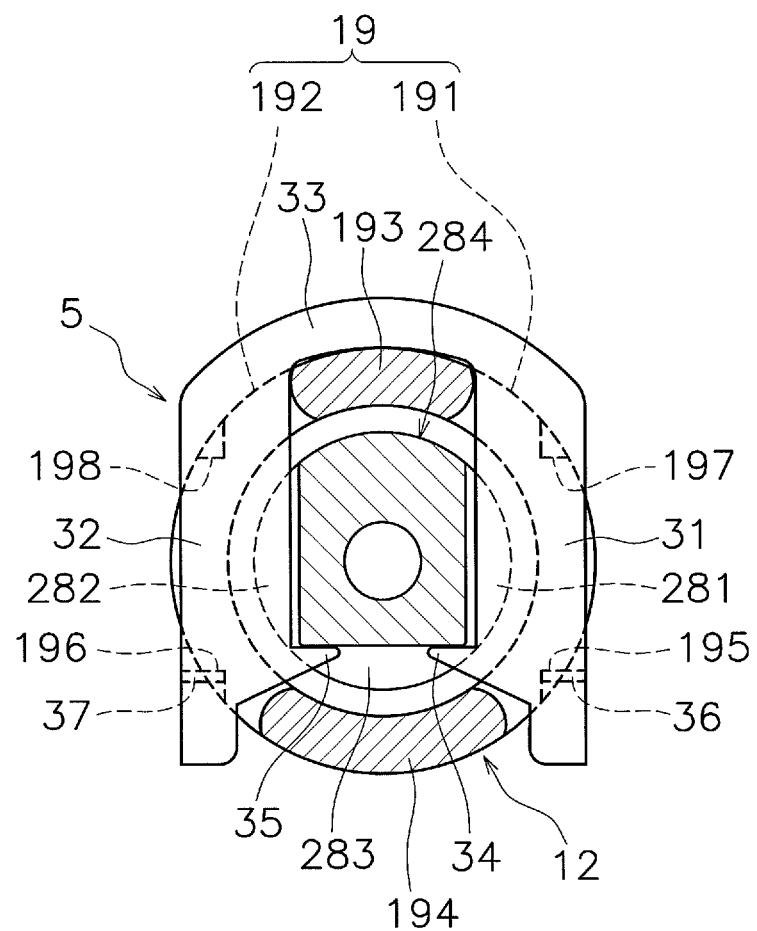
FIG. 7 is a cross-sectional view of FIG. 1 taken along a line VI-VI.

FIG. 7 is a cross-sectional view of FIG. 1 taken along a line VI-VI. As illustrated in FIG. 7, the guide slit 19 includes a first slit 191 and a second slit 192. The first slit 191 and the second slit 192 radially penetrate through the main body tubular portion 12. The first slit 191 and the second slit 192 are disposed right and left while being separated away from each other. The first slit 191 and the second slit 192 are respectively extended along the circumferential direction of the main body tubular portion 12.

The main body tubular portion 12 includes a first non-slit portion 193 and a second non-slit portion 194. The first non-slit portion 193 is positioned between the upper end of the first slit 191 and that of the second slit 192 in the circumferential direction. The second non-slit portion 194 is positioned between the lower end of the first slit 191 and that of the second slit 192 in the circumferential direction.

The main body tubular portion 12 includes a left-and-right side pair of third engaging portions 195 and 196 and a left-and-right side pair of fourth engaging portions 197 and 198. Each of the third engaging portions 195 and 196 and the fourth engaging portions 197 and 198 has a shape radially recessed from the surface of the main body tubular portion 12. The third engaging portions 195 and 196 are positioned below the fourth engaging portions 197 and 198. As illustrated in FIG. 4, the third engaging portions 195 and 196 and the fourth engaging portions 197 and 198 are disposed adjacently to the guide slit 19. The third engaging portions 195 and 196 and the fourth engaging portions 197 and 198 are positioned rearwards of the guide slit 19.

Figure 8:
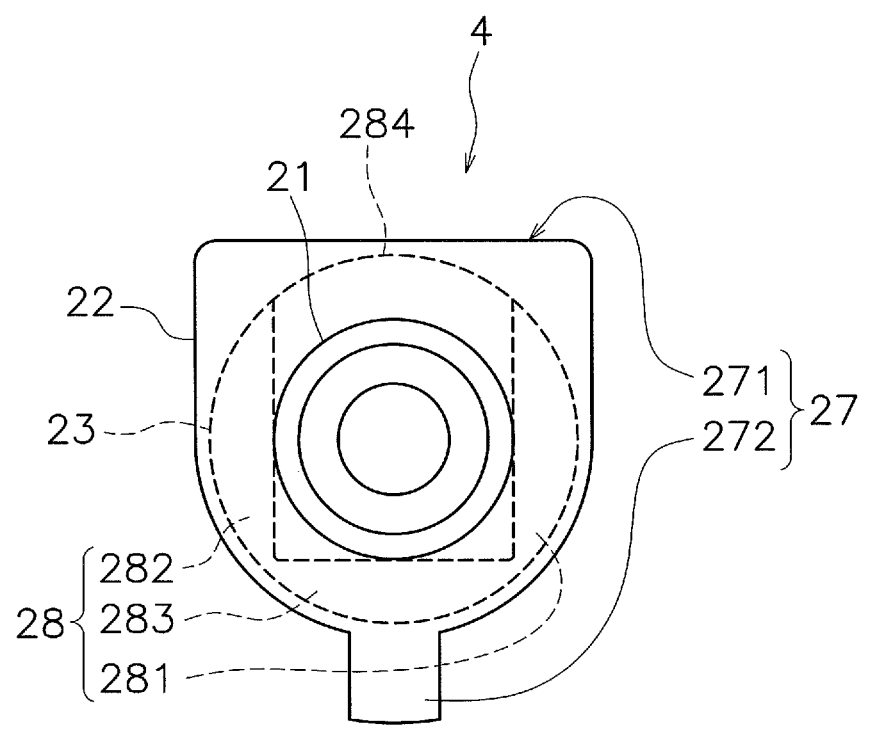
FIG. 8 is a front view of a second member.

As illustrated in FIG. 4, the second member 4 is made of resin, and is attached to the main body tubular portion 12 of the first member 2. The second member 4 is configured to be attachable to the main body tubular portion 12 when being slid in the center axial direction of the main body tubular portion 12. Further, the second member 4 is configured to be detachable from the main body tubular portion 12 when being slid in the center axial direction of the main body tubular portion 12. FIG. 8 is a front view of the second member 4. FIG. 8 is also a view of the second member 4 as viewed in a direction of a longitudinal axis of the second member 4.

As illustrated in FIGS. 4 and 8, the second member 4 includes a second connection tubular portion 21, the lid portion 22, an inner tubular portion 23 and a first seal member 24. The second connection tubular portion 21 is a portion for connecting the second member 4 to the relevant fuel pipe. The second connection tubular portion 21 includes a tapered portion 211 and a barb portion 212. The second connection tubular portion 21 is connected to the relevant fuel pipe by press-fitting the tapered portion 211 and the barb portion 212 into the relevant fuel pipe. The center axis of the second connection tubular portion 21 and that of the main body tubular portion 12 are arranged substantially in the same direction. When explained in detail, the center axis of the second connection tubular portion 21 and that of the main body tubular portion 12 are concentrically arranged.

The lid portion 22 covers the opening 16 of the main body tubular portion 12. The lid portion 22 is positioned rearwards of the second connection tubular portion 21. As illustrated in FIG. 8, the lid portion 22 includes a second engaging portion 27. The second engaging portion 27 has a shape matched with that of the aforementioned first engaging portion 17. When explained in detail, the second engaging portion 27 includes the engaging edge 271 and the protrusion 272.

The engaging edge 271 is a portion of the outer edge of the lid portion 22. The engaging edge 271 has a non-circular shape. The engaging edge 271 has a shape matched with that of the aforementioned first recess 171 of the main body tubular portion 12. When explained in detail, the engaging edge 271 has a linear shape. The engaging edge 271 is the upper edge of the lid portion 22. The protrusion 272 is protruded from the outer edge of the lid portion 22. When explained in detail, the protrusion 272 is downwardly protruded from the outer edge of the lid portion 22. The protrusion 272 has a shape matched with that of the aforementioned second recess 172 of the main body tubular portion 12.

As illustrated in FIG. 4, the inner tubular portion 23 is positioned rearwards of the lid portion 22. The inner tubular portion 23 has an outer diameter greater than that of the second connection tubular portion 21. The outer diameter of the inner tubular portion 23 is slightly less than the inner diameter of the main body tubular portion 12. The inner tubular portion 23 is disposed within the main body tubular portion 12. As illustrated in FIG. 5, the inner tubular portion 23 includes an attachment groove 231 on the outer peripheral surface thereof. The first seal member 24 is fitted into the attachment groove 231 and is thus attached to the inner tubular portion 23. The first seal member 24 is positioned rearwards of the lid portion 22. In other words, the lid portion 22 is positioned between the first seal member 24 and the second connection tubular portion 21.

As illustrated in FIG. 4, the second member 4 includes a guide groove 28. The guide groove 28 is provided in a position corresponding to that of the guide slit 19. The guide groove 28 is positioned between the lid portion 22 and the inner tubular portion 23. As illustrated in FIG. 8, the guide groove 28 is provided on a portion of the entire circumference of the second member 4. When explained in detail, the guide groove 28 includes a first groove portion 281, a second groove portion 282 and a third groove portion 283. The first groove portion 281 and the second groove portion 282 are disposed right and left while being separated away from each other. The first groove portion 281 is provided in a position corresponding to that of the first slit 191. The second groove portion 282 is provided in a position corresponding to that of the second slit 192. The third groove portion 283 is positioned below the first groove portion 281 and the second groove portion 282.

The second member 4 includes a non-guide portion 284 in which the guide groove 28 is not provided. The non-guide portion 284 is disposed in alignment with the guide groove 28 in the circumferential direction. When explained in detail, the non-guide portion 284 is positioned between the upper end of the first groove portion 281 and that of the second groove portion 282 in the circumferential direction.

Figure 9:
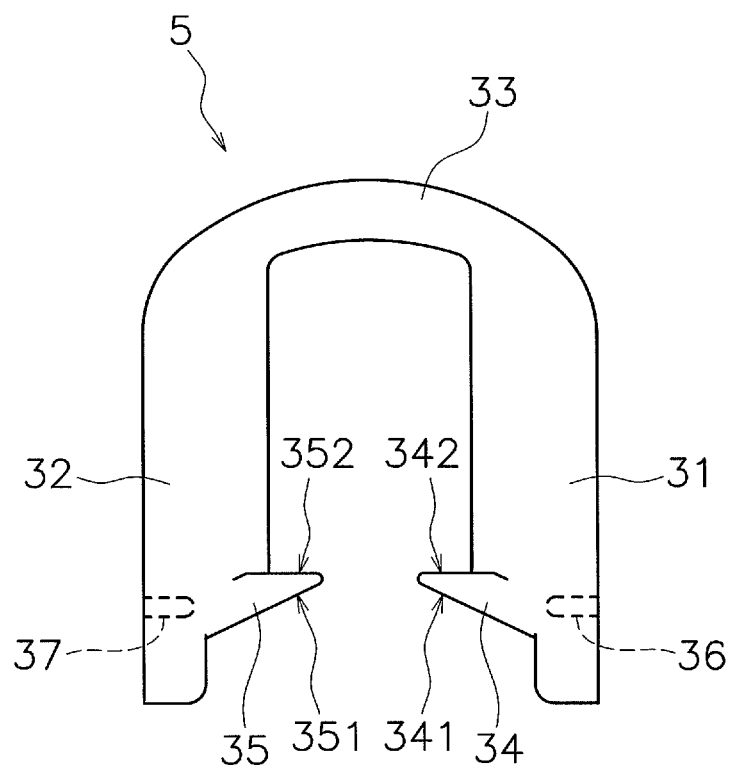
FIG. 9 is a front view of an attachment portion.

The attachment portion 5 is configured to be able to restrict and derestrict a slide action of the second member 4 with respect to the first member 2. The attachment portion 5 is configured to restrict the slide action of the second member 4 when being engaged with the guide slit 19 and the guide groove 28. FIG. 9 is a front view of the attachment portion 5. As illustrated in FIG. 9, the attachment portion 5 is substantially U-shaped. The attachment portion 5 is made of resin, and is elastically deformable.

The attachment portion 5 includes a first attachment portion 31, a second attachment portion 32 and a coupling portion 33. The first attachment portion 31 has a linear shape extended in the up-and-down direction. The second attachment portion 32 has a linear shape extended in the up-and-down direction. The first attachment portion 31 and the second attachment portion 32 are disposed right and left while being separated away from each other. The coupling portion 33 couples the upper portion of the first attachment portion 31 and that of the second attachment portion 32.

The attachment portion 5 includes a first protrusion 34 and a second protrusion 35. The first protrusion 34 is provided while being protruded from the inner lateral surface of the first attachment portion 31 in the right-and-left direction. The first protrusion 34 includes a first tapered portion 341 on the bottom surface thereof. The first protrusion 34 includes a first flat portion 343 on the top surface thereof. The first flat portion 342 has a flat shape parallel to the right-and-left direction. The second protrusion 35 is provided while being protruded from the inner lateral surface of the second attachment portion 32 in the right-and-left direction. The second protrusion 35 includes a second tapered portion 351 on the bottom surface thereof. The second protrusion 35 includes a second flat portion 352 on the top surface thereof. The second flat portion 352 has a flat shape parallel to the right-and-left direction.

The attachment portion 5 includes a third protrusion 36 and a fourth protrusion 37. The third protrusion 36 is provided while being backwardly protruded from the rear surface of the first attachment portion 31. The fourth protrusion 37 is provided while being backwardly protruded from the rear surface of the second attachment portion 32.

The filter element portion 3 is accommodated in the main body tubular portion 12. As illustrated in FIG. 4, the filter element portion 3 includes a filtering member 41, a support member 42, a third connection tubular portion 43 and a second seal member 44. The filtering member 41 filters a fuel. The support member 42 supports the filtering member 41.

The third connection tubular portion 43 is configured to be connectable to the second member 4. As illustrated in FIG. 5, the second member 4 includes a fitting recess 29. The fitting recess 29 is provided on the inner tubular portion 23. The fitting recess 29 has a shape forwardly dented from the rear surface of the inner tubular portion 23. The third connection tubular portion 43 is inserted into the fitting recess 29. Accordingly, the fitting recess 29 is fitted onto the third connection tubular portion 43.

The third connection tubular portion 43 includes an attachment groove 431 on the outer peripheral surface thereof. When fitted into the attachment groove 431, the second seal member 44 is attached to the third connection tubular portion 43. The second seal member 44 is disposed between the third connection tubular portion 43 and the fitting recess 29.

The first connection tubular portion 11 of the first member 2 includes a first through hole 45 penetrating therethrough in the center axial direction. The first through hole 45 is communicated with the accommodation space of the main body tubular portion 12. The second member 4 includes a second through hole 46 penetrating therethrough in the center axial direction. The second through hole 46 is communicated with a space produced within the fitting recess 29. The third connection tubular portion 43 includes a third through hole 47 penetrating therethrough in the center axial direction. The third through hole 47 is communicated with the inner space of the support member 42. The third through hole 47 is connected to the second through hole 46 while the third connection tubular portion 43 is fitted into the fitting recess 29.

As illustrated in FIGS. 5 and 6, the main body tubular portion 12 includes a plurality of protrusions 175 on the inner surface thereof. These protrusions 175 are disposed in positions where they are opposed to the rear surface of the filter element portion 3. The protrusions 175 function as spacers to reliably produce a space between the rear surface of the filter element portion 3 and the inner surface of the main body tubular portion 12. Accordingly, even when the third connection tubular portion 43 of the filter element portion 3 is detached from the fitting recess 29 of the second member 4, the fuel is allowed to reliably flow in a direction from the accommodation space to the first through hole 45 or from the first through hole 45 to the accommodation space.

Next, an explanation will be made for an attachment/detachment action between the first member 2 and the second member 4. The second member 4 is detachably attached to the first member 2 when being slid in the center axial direction. As described above, the attachment portion 5 is configured to be able to restrict and derestrict the slide action of the second member 4 with respect to the first member 2. FIGS. 1 and 3 illustrate a state in which the attachment portion 5 restricts the slide action of the second member 4 with respect to the first member 2 (hereinafter referred to as "a restricted state"). FIG. 7 illustrates a cross-sectional view of FIG. 1 taken along a line VI-VI where the attachment portion 5 is set to be in the restricted state.

As illustrated in FIG. 7, in the restricted state, the first attachment portion 31 is fitted into the first slit 191 of the main body tubular portion 12 and the first groove portion 281. Further, the second attachment portion 32 is fitted into the second slit 192 of the main body tubular portion 12 and the second groove portion 282. Accordingly, the second member 4 is restricted from moving in the center axial direction with respect to the first member 2. In other words, the slide action of the second member 4 is restricted by the attachment portion 5.

Further, in the restricted state, the first protrusion 34 and the second protrusion 35 are locked with the third groove portion 283 of the second member 4. The third protrusion 36 is engaged with the third engaging portion 195. The fourth protrusion 37 is engaged with the third engaging portion 196. Accordingly, the attachment portion 5 is kept in the restricted state.

Figure 10:
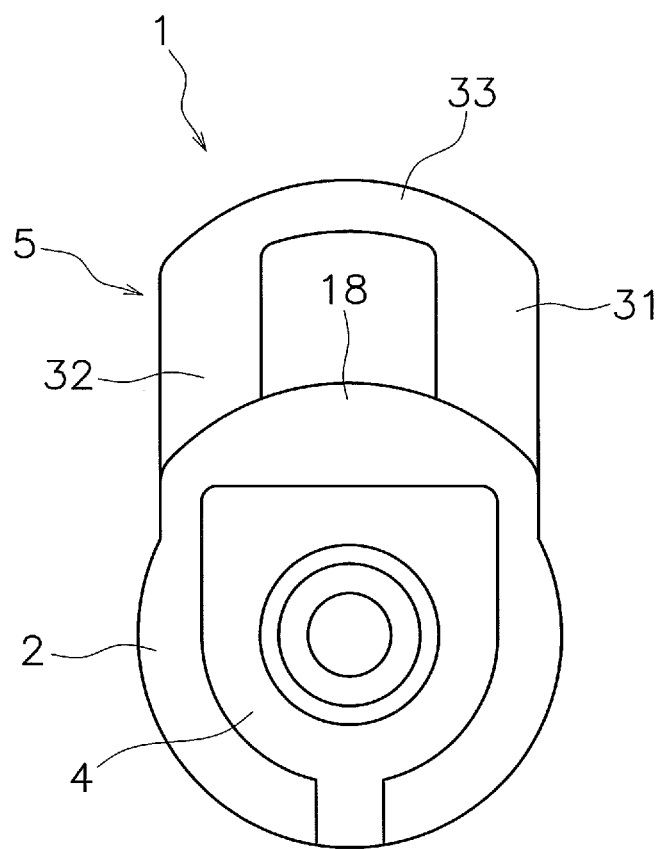
FIG. 10 is a front view of the fuel filter device where the attachment portion is set to be in a derestricted state.
Figure 11:
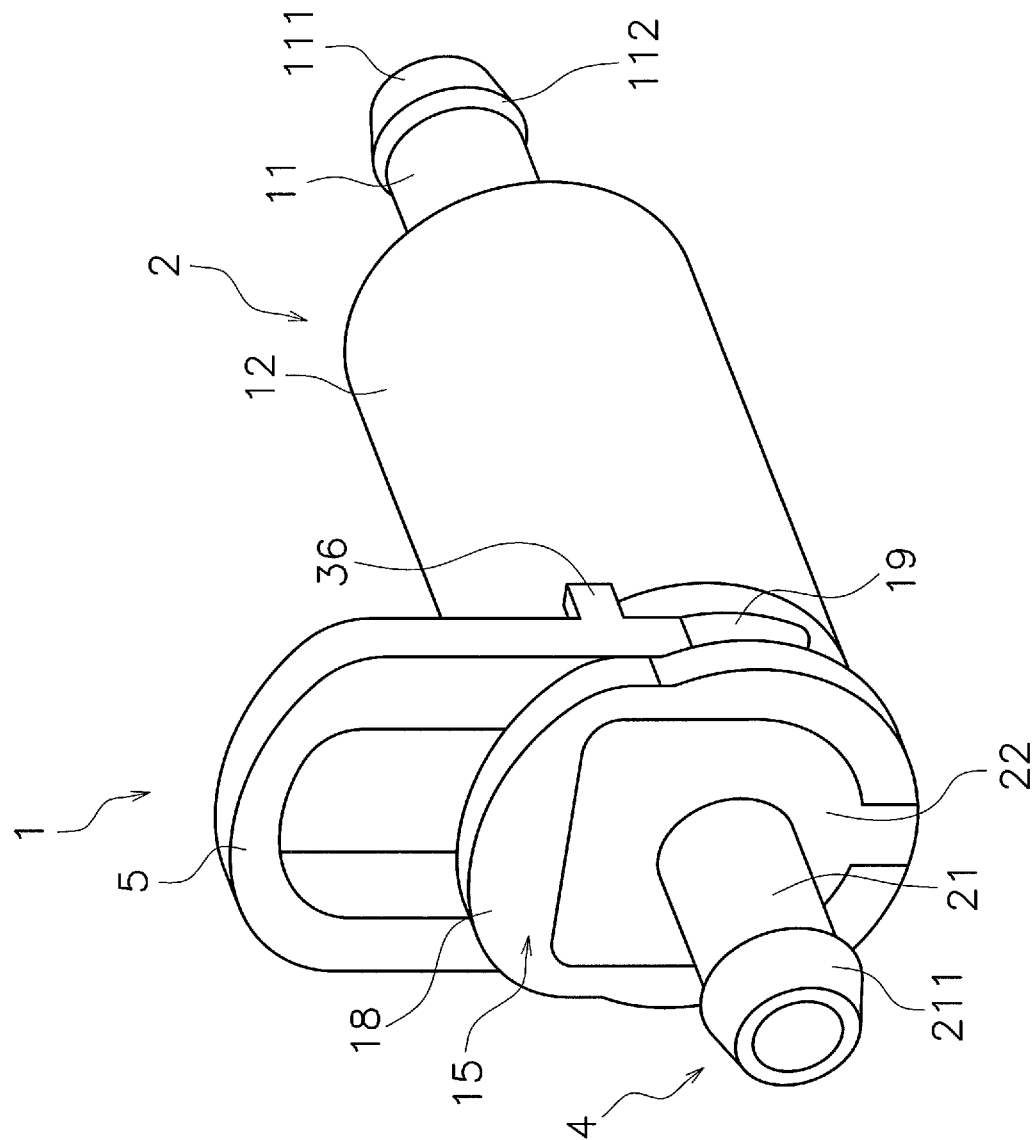
FIG. 11 is a perspective view of the fuel filter device where the attachment portion is set to be in the derestricted state.
Figure 12:
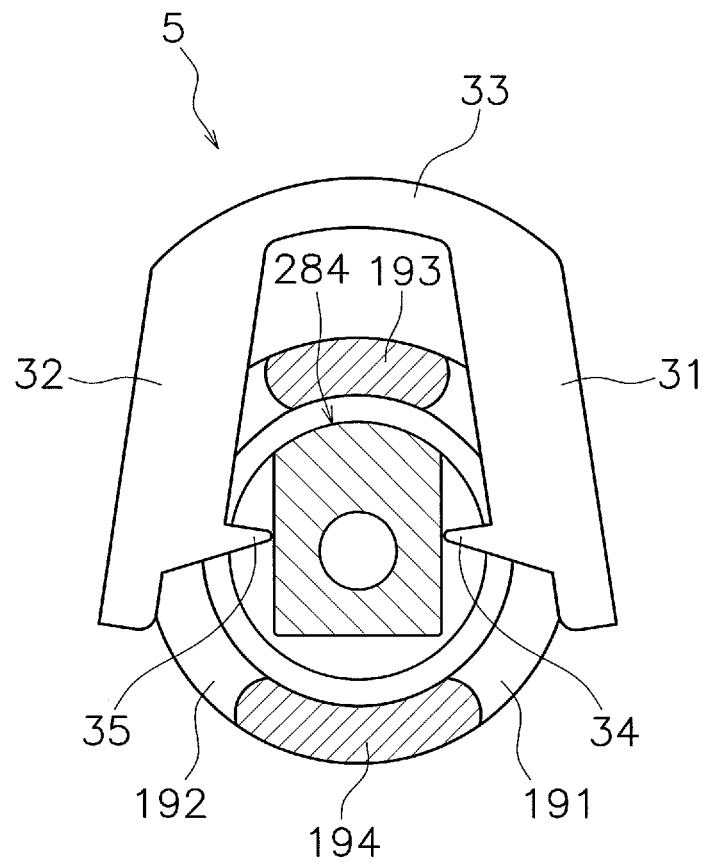
FIG. 12 is a cross-sectional view of FIG. 1 taken along the line VI-VI in the course of transition from a restricted state to the derestricted state of the attachment portion.
Figure 13:
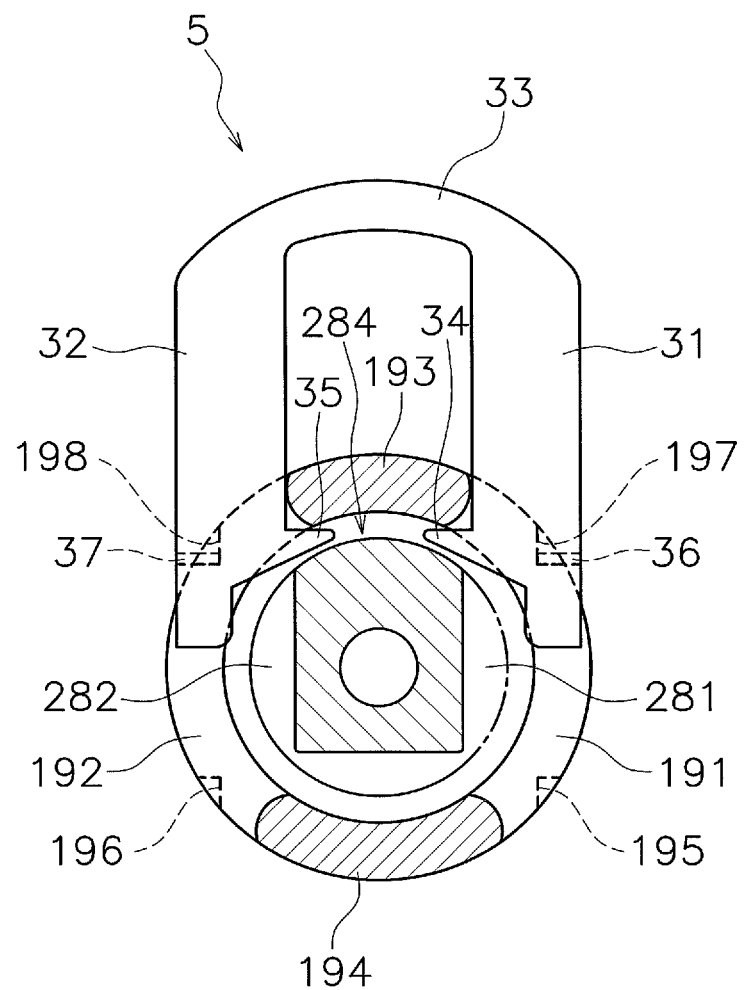
FIG. 13 is a cross-sectional view of FIG. 1 taken along the line VI-VI where the attachment portion is set to be in the derestricted state.

FIG. 10 illustrates a state in which the attachment portion 5 derestricts (allows) the slide action of the second member 4 with respect to the first member 2 (hereinafter referred to as "a derestricted state"). FIG. 11 is a perspective view of the fuel filter device 1 where the attachment portion is set to be in the derestricted state. FIG. 12 illustrates a cross-sectional view of FIG. 1 taken along the line VI-VI where the attachment portion 5 is being transitioned from the restricted state to the derestricted state. FIG. 13 illustrates a cross-sectional view of FIG. 1 taken along the line VI-VI where the attachment portion 5 is set to be in in the derestricted state.

As illustrated in FIG. 12, when transitioned from the restricted state to the derestricted state, the attachment portion 5 is elastically deformed for extending the interval between the first protrusion 34 and the second protrusion 35. Further, the attachment portion 5 is moved upwards. At this time, the first attachment portion 31 is upwardly moved along the first slit 191. On the other hand, the second attachment portion 32 is upwardly moved along the second slit 192. The first attachment portion 31 is guided by the first slit 191. The second attachment portion 32 is guided by the second slit 192. Further, the first attachment portion 31 and the second attachment portion 32 make contact with the flange 18 of the main body tubular portion 12 (see FIG. 10). This substantially prevents the first attachment portion 31 and the second attachment portion 32 from being excessively tilted.

As illustrated in FIG. 13, in the derestricted state, the first attachment portion 31 and the first protrusion 34 are retracted to positions where they are not overlapped with the first groove portion 281, when seen in the center axial direction. On the other hand, the second attachment portion 32 and the second protrusion 35 are retracted to positions where they are not overlapped with the second groove portion 282, when seen in the center axial direction. Accordingly, the second member 4 becomes movable in the center axial direction with respect to the first member 2. In other words, the slide action of the second member 4 is derestricted by the attachment portion 5.

Further, in the derestricted state, the first protrusion 34 and the second protrusion 35 are positioned between the first non-slit portion 193 and the non-guide portion 284. Therefore, even in attempting to further upwardly move the attachment portion 5, the first protrusion 34 and the second protrusion 35 make contact with the first non-slit portion 193 of the main body tubular portion 12. Accordingly, a situation can be substantially prevented in which the attachment portion 5 is detached from the guide slit 19 and comes off from the first member 2. Contrarily, even in attempting to downwardly move the attachment portion 5, the first protrusion 34 and the second protrusion 35 make contact with the non-guide portion 284. Accordingly, the attachment portion 5 is restricted from moving downwards. Further, the third protrusion 36 is engaged with the fourth engaging portion 197. The fourth protrusion 37 is engaged with the fourth engaging portion 198. The attachment portion 5 is thereby kept in the restricted state.

Similarly to the above, in transitioning the attachment portion 5 from the derestricted state to the restricted state, the attachment portion 5 is also elastically deformed for extending the interval between the first protrusion 34 and the second protrusion 35. Further, the attachment portion 5 is moved downwards. It should be noted that the bottom surface of the first protrusion 34 and that of the second protrusion 35 are tapered and configured to make contact with the non-guide portion 284 provided as a rounded surface in the derestricted state. Therefore, in transitioning the attachment portion 5 from the derestricted state to the restricted state, the attachment portion 5 can be easily moved downwards with a small force.

As explained above, in the fuel filter device 1 according to the present exemplary embodiment, the second member 4 can be detached from the main body tubular portion 12 by releasing restriction applied to the slide action of the second member 4 from the attachment portion 5. Therefore, the filter element portion 3 can be replaced without respectively detaching the first member 2 and the second member 4 from the relevant fuel pipes. Accordingly, the fuel pipes can be substantially prevented from being scratched in filter replacement. Further, only the filter element portion 3 can be replaced without replacing the first member 2 and the second member 4. Therefore, it is possible to reduce filter replacement costs.

Yet further, the second member 4 is detached from the main body tubular portion 12 by means of the slide action thereof. Therefore, the second member 4 can be detached from the main body tubular portion 12 without excessively rotating either the second member 4 or the first member 2 relatively to the relevant fuel pipe. Accordingly, a filter replacement work can be easily done.

The engaging edge 271 of the lid portion 22 has a shape matched with the first recess 171 of the main body tubular portion 12. Therefore, the engaging edge 271 is engaged with the first recess 171 in attaching the second member 4 to the first member 2, and the second member 4 is thereby positioned. Thus, it is possible to keep constant the attachment posture of the second member 4 with respect to the first member 2. In other words, in the attachment of the second member 4, the relevant fuel pipe can be inhibited from being twisted.

The protrusion 272 of the lid portion 22 has a shape matched with the second recess 172 of the main body tubular portion 12. Therefore, the protrusion 272 is engaged with the second recess 172 in attaching the second member 4 to the first member 2, and the second member 4 is thereby positioned. Thus, it is possible to keep constant the attachment posture of the second member 4 with respect to the first member 2. In other words, in the attachment of the second member 4, the relevant fuel pipe can be inhibited from being twisted.

The filter element portion 3 is attached to the second member 4 by fitting the third connection tubular portion 43 of the filter element portion 3 into the fitting recess 29 of the second member 4. Therefore, the filter element portion 3 is taken out of the first member 2 when the second member 4 is detached from the first member 2. Thus, the filter element portion 3 can be easily taken out therefrom.

Joints among the first member 2, the second member 4, the filter element portion 3 and the attachment portion 5 are respectively achieved by means of fitting. Therefore, it is possible to reduce the number of components providing the fuel filter device 1. Accordingly, reduction in size of the fuel filter device 1 can be achieved, while appropriate pressure resistance can be reliably achieved.

The first connection tubular portion 11, the main body tubular portion 12 and the second connection tubular portion 21 are disposed concentrically to each other. In other words, the fuel filter device 1 according to the present exemplary embodiment is the one of an inline type. Therefore, the fuel filter device 1 can be disposed along fuel lines provided by the fuel pipes. Accordingly, the fuel pipes can be simply structured.

Figure 14:
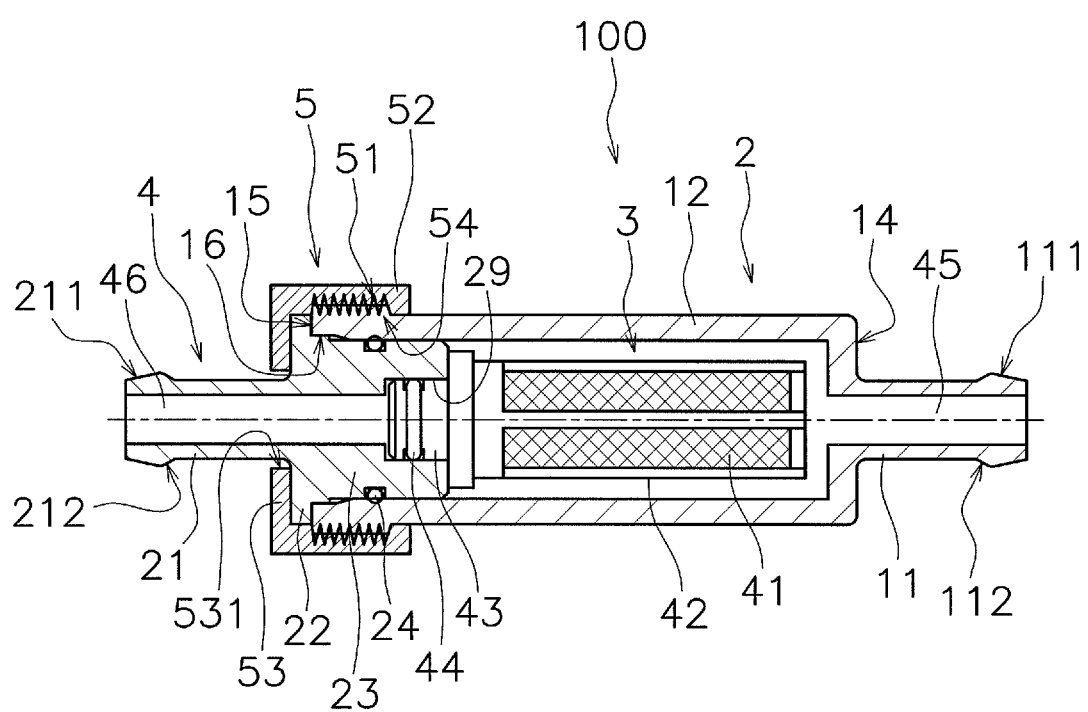
FIG. 14 is a cross-sectional side view of a fuel filter device according to a second exemplary embodiment.

Next, an explanation will be made for the fuel filter device 100 according to a second exemplary embodiment. FIG. 14 is a cross-sectional side view of the fuel filter device 100 according to the second exemplary embodiment. It should be noted that in FIG. 14, the same reference numerals will be assigned to components similar to those of the fuel filter device 1 according to the first exemplary embodiment.

As illustrated in FIG. 14, the main body tubular portion 12 includes a male threaded portion 51 on the outer peripheral surface of the second end portion 15 thereof. The attachment portion 5 includes a tubular portion 52 and a flat plate portion 53. The tubular portion 52 includes a female threaded portion 54 on the inner peripheral surface thereof. The female threaded portion 54 is screwed onto the male threaded portion 51. One end of the tubular portion 52 is opened. The flat plate portion 53 closes the other end of the tubular portion 52. The flat plate portion 53 includes an opening 531. The opening 531 penetrates through the flat plate portion 53 in the center axial direction. The inner diameter of the opening 531 is greater than the outer diameter of the second connection tubular portion 21. The second connection tubular portion 21 is disposed while passing through the opening 531.

An explanation will be made as follows regarding the attachment/detachment action between the first member 2 and the second member 4 in the fuel filter device 100 according to the second exemplary embodiment. In detaching the second member 4 from the first member 2, the attachment portion 5 is rotated with respect to the main body tubular portion 12 of the first member 2. Accordingly, the female threaded portion 54 of the attachment portion 5 is unscrewed from the male threaded portion 51 of the main body tubular portion 12. Accordingly, the slide action of the second member 4 with respect to the first member 2 is derestricted. Then, the second member 4 is slid with respect to the first member 2 in the center axial direction. Accordingly, the second member 4 is detached from the first member 2 together with the attachment portion 5.

Contrarily, in attaching the second member 4 to the first member 2, the second member 4 is slid with respect to the first member 2 in the center axial direction. Accordingly, the second member 4 is attached to the first member 2. Then, the attachment portion 5 is rotated with respect to the main body tubular portion 12 of the first member 2. Accordingly, the female threaded portion 54 of the attachment portion 5 is screwed into the male threaded portion 51 of the main body tubular portion 12. The slide action of the second member 4 is thereby restricted with respect to the first member 2. Thus, the second member 4 is fixed to the first member 2.

As described above, even in the fuel filter device 100 according to the second exemplary embodiment, the filter element portion 3 can be replaced without respectively detaching the first member 2 and the second member 4 from the relevant fuel pipes, similarly to the fuel filter device 1 according to the first exemplary embodiment. Further, the second member 4 can be detached from the main body tubular portion 12 without excessively rotating either the second member 4 or the first member 2 relatively to the relevant fuel pipe.

Figure 15:
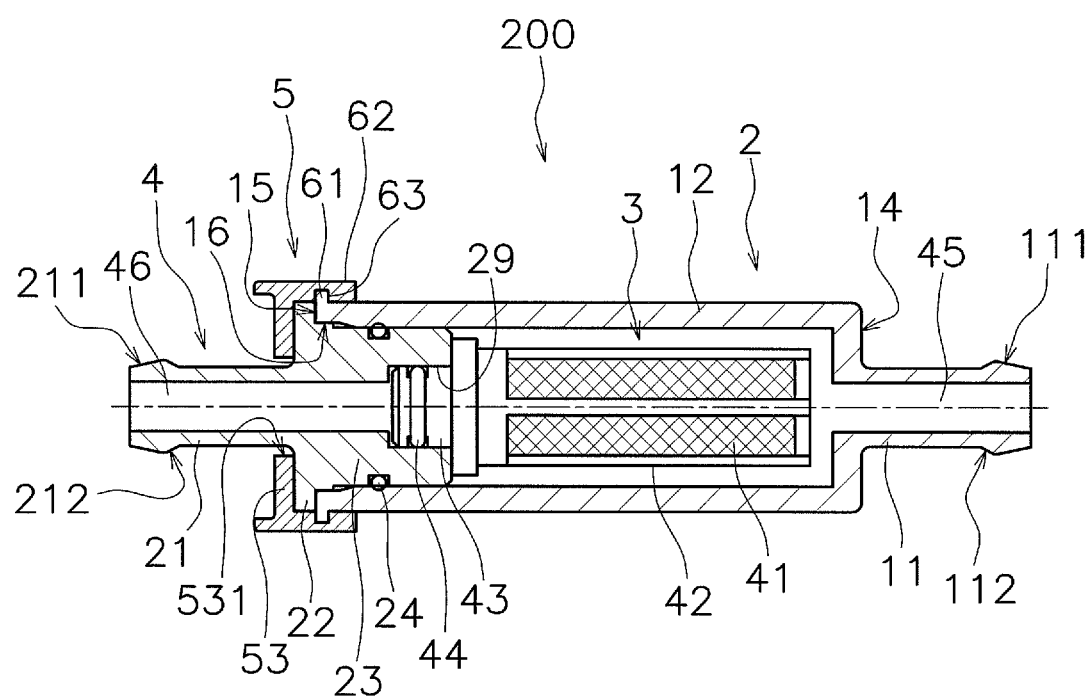
FIG. 15 is a cross-sectional side view of a fuel filter device according to a third exemplary embodiment.

Next, an explanation will be made for a fuel filter device 200 according to a third exemplary embodiment. FIG. 15 is a cross-sectional side view of the fuel filter device 200 according to the third exemplary embodiment. It should be noted that in FIG. 15, the same reference numerals will be assigned to components similar to those of the aforementioned fuel filter device.

As illustrated in FIG. 15, the main body tubular portion 12 is provided with a flange 61 on the second end portion 15. The attachment portion 5 includes the flat plate portion 53 and a held portion 62. The outer diameter of the flat plate portion 53 is greater than that of the second connection tubular portion 21. The flat plate portion 53 includes the opening 531. The second connection tubular portion 21 is disposed while penetrating through the opening 531.

The held portion 62 is backwardly protruded from the flat plate portion 53. In other words, the held portion 62 is protruded from the flat plate portion 53 towards the first member 2. The held portion 62 has a tubular shape. The held portion 62 includes a recess 63 on the inner peripheral surface thereof. The recess 63 is positioned in correspondence with the flange 61. When the flange 61 is engaged with the recess 63, the held portion 62 is held by the flange 61. The opening 531 of the flat plate portion 53 penetrates through the flat plate portion 53 in the center axial direction.

An explanation will be made as follows regarding the attachment/detachment action between the first member 2 and the second member 4 in the fuel filter device 200 according to the third exemplary embodiment. In detaching the second member 4 from the first member 2, the attachment portion 5 is elastically deformed for releasing the held portion 62 held by the flange 61. Accordingly, the slide action of the second member 4 with respect to the first member 2 is derestricted in the center axial direction. Then, the second member 4 is slid with respect to the first member 2 in the center axial direction. Accordingly, the second member 4 is detached from the first member 2 together with the attachment portion 5.

Contrarily, in attaching the second member 4 to the first member 2, the second member 4 is slid with respect to the first member 2 in the center axial direction. Accordingly, the second member 4 is attached to the first member 2. Then, the attachment portion 5 is elastically deformed for allowing the held portion 62 to be held by the flange 61. The slide action of the second member 4 is thereby restricted with respect to the first member 2 in the center axial direction. Thus, the second member 4 is fixed to the first member 2.

As described above, even in the fuel filter device 200 according to the third exemplary embodiment, the filter element portion 3 can be replaced without respectively detaching the first member 2 and the second member 4 from the relevant fuel pipes, similarly to the fuel filter device 1 according to the first exemplary embodiment. Further, the second member 4 can be detached from the main body tubular portion 12 without excessively rotating either the second member 4 or the first member 2 relatively to the relevant fuel pipe.

Figure 16:
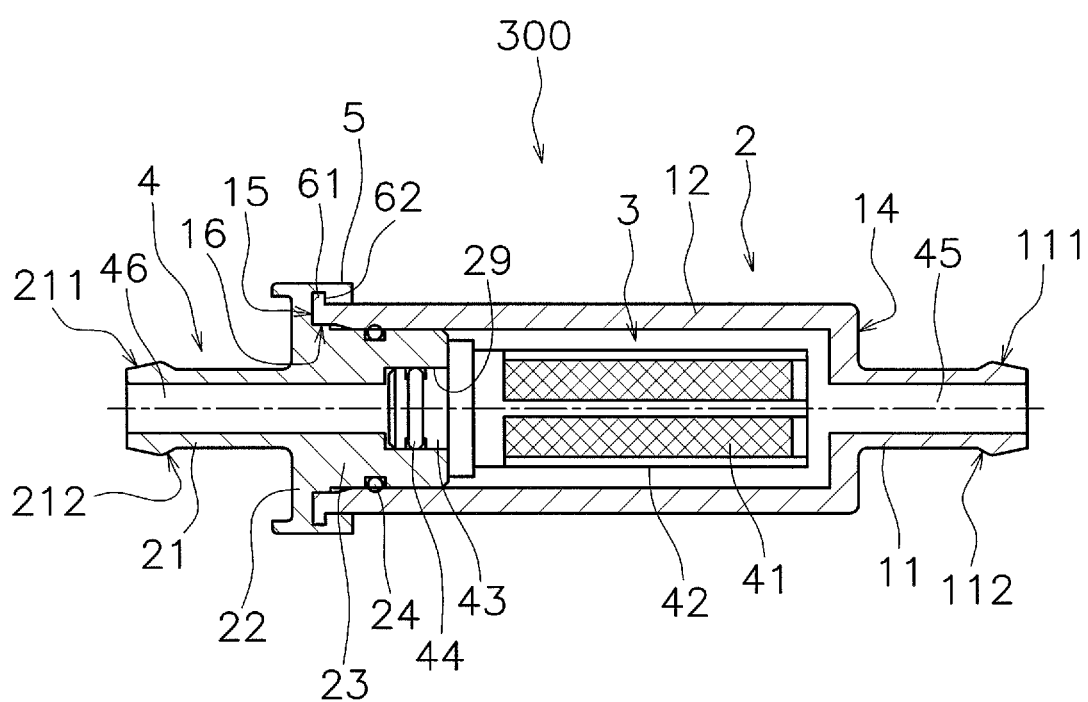
FIG. 16 is a cross-sectional side view of a fuel filter device according a fourth exemplary embodiment.

Next, an explanation will be made for a fuel filter device 300 according to a fourth exemplary embodiment. FIG. 16 is a cross-sectional side view of the fuel filter device 300 according to the fourth exemplary embodiment. It should be noted that in FIG. 16, the same reference numerals will be assigned to components similar to those of the aforementioned fuel filter device.

As illustrated in FIG. 16, the main body tubular portion 12 is provided with the flange 61 on the second end portion 15. The attachment portion 5 is integrated with the second member 4. The attachment portion 5 is backwardly protruded from the outer edge of the lid portion 22. In other words, the attachment portion 5 is protruded from the outer edge of the lid portion 22 towards the first member 2. The attachment portion 5 includes the held portion 62. The held portion 62 is a recess provided on the inner peripheral surface of the attachment portion 5, and is held by the flange 61.

An explanation will be made as follows regarding the attachment/detachment action between the first member 2 and the second member 4 in the fuel filter device 300 according to the fourth exemplary embodiment. In detaching the second member 4 from the first member 2, the attachment portion 5 is elastically deformed for unlocking the engaging portion 62 from the flange 61, while the second member 4 is slid with respect to the first member 2 in the center axial direction. Accordingly, the slide action of the second member 4 with respect to the first member 2 is derestricted in the center axial direction. Then, the second member 4 is further slid with respect to the first member 2 in the center axial direction. Accordingly, the second member 4 is detached from the first member 2 together with the attachment portion 5.

Contrarily, in attaching the second member 4 to the first member 2, the second member 4 is slid with respect to the first member 2 in the center axial direction. Then, the attachment portion 5 is elastically deformed, while the second member 4 is further slid with respect to the first member 2 in the center axial direction. Accordingly, the held portion 62 is held by the flange 61. The slide action of the second member 4 is thereby restricted with respect to the first member 2 in the center axial direction. Thus, the second member 4 is fixed to the first member 2.

As described above, even in the fuel filter device 300 according to the fourth exemplary embodiment, the filter element portion 3 can be replaced without respectively detaching the first member 2 and the second member 4 from the relevant fuel pipes, similarly to the fuel filter device 1 according to the first exemplary embodiment. Further, the second member 4 can be detached from the main body tubular portion 12 without excessively rotating either the second member 4 or the first member 2 relatively to the relevant fuel pipe.

Exemplary embodiments of the present invention have been explained above. However, the present invention is not limited to the aforementioned exemplary embodiments, and a variety of changes can be made without departing from the scope of the present invention.

The first member 2, the second member 4, the attachment portion 5 may be made of a material except for resin. For example, the first member 2, the second member 4 and the attachment portion 5 may be made of metal.

The lid portion 22 is not limited to be provided in the aforementioned shape. For example, either the engaging edge 271 or the protrusion 272 may not be provided. Alternatively, the lid portion 22 may be provided in a shape different from the aforementioned shape including the engaging edge 271 and the protrusion 272.

The inner tubular portion 23 of the second member 4 may not be provided. The second seal member 44 of the filter element portion 3 may not be provided. Further, the filter element portion 3 may be disposed in the accommodation space of the main body tubular portion 12 without being attached to the second member 4.

The fuel filter device 1 is not limited to be of the inline type. In other words, the center line of the first connection tubular portion 11 may be arranged in a direction different from that of the center line of the main body tubular portion 12. Further or alternatively, the center line of the second connection tubular portion 21 may be arranged in a direction different from that of the center line of the main body tubular portion 12.

The aforementioned fuel filter device is a device for filtering a fuel, but can be used as a device for filtering the other types of liquid except for a fuel.

What is claimed is:

1. A fuel filter device, comprising:
   a first member including:
      a first connection tubular portion configured to connect the first member to a fuel pipe; and
      a main body tubular portion including a first end portion on which the first connection tubular portion is disposed and a second end portion through which an opening is provided, the main body tubular portion including a flow channel cross-section that is greater than a flow channel cross-section of the first connection tubular portion, the main body tubular portion includes a guide slit;
   a filter element portion accommodated in the main body tubular portion;
   a second member including:
      a second connection tubular portion configured to connect the second member to a fuel pipe; and
      a lid portion covering the opening of the main body tubular portion, the second member configured to be detachable from the main body tubular portion when caused to perform a slide action in a center axial direction of the main body tubular portion, when the lid portion is attached to the main body tubular portion, the second connection tubular portion has a longitudinal axis extending from the lid portion in the center axial direction of the main body tubular portion; and
   an attachment portion configured to restrict and allow the slide action of the second member, the attachment portion being configured to be engaged with the guide slit, the attachment portion including a protrusion that contacts the main body tubular portion so as to substantially prevent detachment of the attachment portion from the guide slit when the slide action of the second member is allowed,
   wherein the second end portion of the main body tubular portion includes a first engaging portion configured to position the main body tubular portion and the lid portion,
   wherein the lid portion includes a second engaging portion configured to match with the first engaging portion of the main body tubular portion in a radial direction extending radially from the center axial direction, such that an outer edge of the lid portion is located radially within an inner edge of the first engaging portion of the main body tubular portion, the second engaging portion being an outer edge of the lid portion,
   wherein the lid portion includes a linear shaped portion of the outer edge and a rounded portion on an opposite side of the lid portion from the linear shaped portion, the linear shaped portion of the outer edge of the lid portion being located radially within the inner edge of the first engaging portion, the second engaging portion having a non-circular shape as viewed in a direction of a longitudinal axis of the second member,
   wherein the rounded portion of the lid portion has an arc shape that corresponds to a shape of an outer circumference of the filter element,
   wherein the second member includes a protrusion protruding from the outer edge of the lid portion to an outer peripheral surface of the second end portion of the main body tubular portion, the protrusion extending orthogonally from the outer edge of the lid portion relative to the center axial direction of the main body tubular portion,
   wherein the first engaging portion includes a recess having a shape matched with the protrusion,
   wherein the outer edge of the lid is slidable against the inner edge of the first engaging portion in the center axial direction,
   wherein the protrusion extends from an apex of the arc shape of the rounded portion,
   wherein a length from a base of the protrusion at the apex of the arc shape to the linear shaped portion of the lid portion corresponds to a diameter of the filter element,
   wherein the second member further includes:
      an inner tubular portion disposed within the main body tubular portion; and
      a first seal member configured to be attached to the inner tubular portion,
   wherein the lid portion is positioned between the first seal member and the second connection tubular portion,
   wherein the filter element portion includes a third connection tubular portion configured to be connectable to the second member,
   wherein the second member includes a fitting recess configured to be fitted onto the third connection tubular portion, and
   wherein the fuel filter device further includes a second seal member configured to be disposed between the third connection tubular portion and the fitting recess.

2. The fuel filter device according to claim 1, wherein:
   the attachment portion is substantially U-shaped;
   the second member includes a guide groove provided in a position corresponding to a position of the guide slit; and
   the attachment portion is configured to restrict the slide action of the second member when engaged with the guide slit and the guide groove.

3. The fuel filter device according to claim 2, wherein:
   the second member includes the guide groove on a portion of an entire circumference thereof; and
   the second member includes a non-guide portion on which the guide groove is not provided, the non-guide portion being disposed circumferentially in alignment with the guide groove.

4. The fuel filter device according to claim 1, wherein:
the main body tubular portion includes a male threaded portion on an outer peripheral surface of the second end portion,
the attachment portion includes
a tubular portion opened at one end thereof, the tubular portion including a female threaded portion on an inner peripheral surface thereof and configured to allow the female threaded portion to be screwed onto the male threaded portion; and
a flat plate portion closing another end of the tubular portion, and
the flat plate portion includes an opening penetrating therethrough in the center axial direction, the opening being larger than the second connection tubular portion and smaller than the lid portion.

5. The fuel filter device according to claim 1, wherein:
the main body tubular portion is provided with a flange on the second end portion;
the attachment portion includes
a flat plate portion including an opening, the opening being larger than the second connection tubular portion and smaller than the lid portion; and
a held portion protruded from the flat plate portion towards the first member, the held portion held by the flange; and
the opening of the flat plate portion penetrates through the flat plate portion in the center axial direction.

6. The fuel filter device according to claim 1, wherein the filter element portion includes a filtering member that filters a fuel and a support member that supports the filtering member.

7. The fuel filter device according to claim 1, wherein a center axis of the first connection tubular portion and a center axis of the main body tubular portion are arranged substantially in the same direction.

8. The fuel filter device according to claim 1, wherein a center axis of the first connection tubular portion and a center axis of the main body tubular portion are concentrically arranged.

9. The fuel filter device according to claim 1, wherein when the protrusion contacts the main body tubular portion so as to substantially prevent detachment of the attachment portion from the guide slit when the slide action of the second member is allowed, the filter element portion is removable from the main body tubular portion.

10. The fuel filter device according to claim 1, wherein the second engaging portion is separable from the attachment portion.

11. The fuel filter device according to claim 1, wherein the first engaging portion is a concave portion extending from the second end portion of the main body tubular portion in the direction of the longitudinal axis, the second engaging portion is disposed in the concave portion.

12. The fuel filter device according to claim 1, wherein the second engaging portion is composed of the entire outer perimeter of the lid portion as viewed in the direction of the longitudinal axis of the second member.

13. The fuel filter device according to claim 3, wherein
the main body tubular portion includes a first non-slit portion, and
the attachment portion is configured to allow the slide action when the attachment portion is disengaged from the guide groove, and is engaged between the non-guide portion and the first non-slit portion.

14. A fuel filter device, comprising:
a first member including
a first connection tubular portion configured to connect the first member to a fuel pipe; and
a main body tubular portion including a first end portion on which the first connection tubular portion is disposed and a second end portion through which an opening is provided, the main body tubular portion including a flow channel cross-section that is greater than a flow channel cross-section of the first connection tubular portion, the second end portion having a flange protruded from a part of the main body tubular portion, the main body tubular portion including a guide slit disposed adjacent the flange;
a filter element portion accommodated in the main body tubular portion;
a second member including
a second connection tubular portion configured to connect the second member to a fuel pipe; and
a lid portion covering the opening of the main body tubular portion, the second member configured to be detachable from the main body tubular portion when caused to perform a slide action in a center axial direction of the main body tubular portion, when the lid portion is attached to the main body tubular portion, the second connection tubular portion has a longitudinal axis extending from the lid portion in the center axial direction of the main body tubular portion; and
an attachment portion having a restricted state in which the attachment portion is configured to restrict the slide action of the second member, and a derestricted state in which the attachment portion is configured to allow the slide action of the second member,
wherein when the attachment portion is in the derestricted state, the attachment portion is disposed in the guide slit and contacting the flange,
wherein the second end portion of the main body tubular portion includes a first engaging portion configured to position the main body tubular portion and the lid portion, and
wherein the lid portion includes a second engaging portion configured to match with the first engaging portion of the main body tubular portion in a radial direction extending radially from the center axial direction, such that an outer edge of the lid portion is located radially within an inner edge of the first engaging portion of the main body tubular portion, the second engaging portion being an outer edge of the lid portion,
wherein the lid portion further includes a linear shaped portion of the outer edge and a rounded portion on an opposite side of the lid portion from the linear shaped portion, the linear shaped portion of the outer edge of the lid portion being located radially within the inner edge of the first engaging portion, the second engaging portion having a non-circular shape as viewed in a direction of a longitudinal axis of the second member,
wherein the rounded portion of the lid portion has an arc shape that corresponds to a shape of an outer circumference of the filter element,
wherein the second member includes a protrusion protruding from the outer edge of the lid portion to an outer peripheral surface of the second end portion of the main body tubular portion, the protrusion extending orthogonally from the outer edge of the lid portion relative to the center axial direction of the main body tubular portion,
wherein the first engaging portion includes a recess having a shape matched with the protrusion, wherein the outer edge of the lid is slidable against the inner edge of the first engaging portion in the center axial direction, wherein the protrusion extends from an apex of the arc shape of the rounded portion, wherein a length from a base of the protrusion at the apex of the arc shape to the linear shaped portion of the lid portion corresponds to a diameter of the filter element, wherein the second member further includes:
- an inner tubular portion disposed within the main body tubular portion; and
- a first seal member configured to be attached to the inner tubular portion, wherein the lid portion is positioned between the first seal member and the second connection tubular portion, wherein the filter element portion includes a third connection tubular portion configured to be connectable to the second member, wherein the second member includes a fitting recess configured to be fitted onto the third connection tubular portion, and wherein the fuel filter device further includes a second seal member configured to be disposed between the third connection tubular portion and the fitting recess.

15. The fuel filter device of claim 1, wherein the recess of the first member has a first wall and a second wall opposite the first wall, the first and second walls extending from an inside edge of the opening to an outside surface of the first member, and the protrusion includes third and fourth walls shaped to match with the first and second walls of the recess.

* * * * *